United States Patent
Ciochina (10) Patent No.: US 10,873,943 B2
(45) Date of Patent: Dec. 22, 2020

(54) METHOD AND TRANSMITTER FOR ALLOCATING RESOURCES TO TERMINAL IN TELECOMMUNICATION SYSTEM

(71) Applicant: MITSUBISHI ELECTRIC CORPORATION, Tokyo (JP)

(72) Inventor: Cristina Ciochina, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/335,601

(22) PCT Filed: Nov. 1, 2017

(86) PCT No.: PCT/JP2017/040341
§ 371 (c)(1),
(2) Date: Mar. 21, 2019

(87) PCT Pub. No.: WO2018/084322
PCT Pub. Date: May 11, 2018

(65) Prior Publication Data
US 2019/0306860 A1    Oct. 3, 2019

(30) Foreign Application Priority Data

Nov. 4, 2016    (EP) ..................................... 16306449
Feb. 15, 2017   (EP) ..................................... 17305171
Mar. 22, 2017   (EP) ..................................... 17305326

(51) Int. Cl.
*H04W 72/04*    (2009.01)
*H04L 5/00*    (2006.01)
(Continued)

(52) U.S. Cl.
CPC ....... *H04W 72/0453* (2013.01); *H04L 5/0007* (2013.01); *H04L 5/0039* (2013.01);
(Continued)

(58) Field of Classification Search
CPC ................................................. H04W 72/0453
(Continued)

(56) References Cited

U.S. PATENT DOCUMENTS

2019/0222348 A1* 7/2019 Zhang .................... H04W 52/34
2020/0169375 A1* 5/2020 Yi ........................... H04L 5/001

FOREIGN PATENT DOCUMENTS

EP    2 830 378 A1    1/2015

OTHER PUBLICATIONS

Japanese Office Action for Japanese Application No. 2018-566985, dated Jan. 28, 2020, with English translation.
(Continued)

*Primary Examiner* — Peter G Solinsky
(74) *Attorney, Agent, or Firm* — Birch, Stewart, Kolasch & Birch, LLP (57) ABSTRACT

The invention relates to allocating resources in a carrier when several subcarrier spacing configurations coexists, and more particularly to avoid or at least reduce the loss of resources when introducing guard bands to avoid inter-numerology interferences. The invention proposes to start the allocation of resource blocks to a terminal on a different subcarrier than the first subcarrier. Therefore the invention proposes a method to allocate such resource blocks to a terminal.

17 Claims, 4 Drawing Sheets

(51) Int. Cl.
H04W 72/12 (2009.01)
H04W 84/04 (2009.01)
(52) U.S. Cl.
CPC .......... H04L 5/0066 (2013.01); H04L 5/0094 (2013.01); H04W 72/0406 (2013.01); H04W 72/12 (2013.01); *H04L 5/001* (2013.01); *H04L 5/0037* (2013.01); *H04W 72/04* (2013.01); *H04W 72/1278* (2013.01); *H04W 84/042* (2013.01)

(58) Field of Classification Search
USPC .......................................................... 370/330
See application file for complete search history.

(56) References Cited

OTHER PUBLICATIONS

ZTE et al., "About RB Grid Definition and Handling Inter-numerology Interference in NR," 3GPP TSG-RAN WG1 Meeting #86bis, R1-1608963, Lisbon, Portugal, Oct. 10-14, 2016, 9 pages.
Ericsson, Mixed Numerology in an OFDM System [online], 3GPP TSG, 4 1 to R 165833, R, and R RAN WG1#85, Internet <URL:http://www.3gpp.org/ftp/tsg_ran/WG1_RL1/TSGR1_1902/Docs/R1165833.zip>, May 30, 2016.
Notice of Reasons for Refusal issued in corresponding Japanese Application No. 2019-519449 dated Nov. 12, 2019.
Panasonic, Resource allocation of PDSCH for Rel.13 MTC [online], 3GPP TSG/RAN WG1#83, Internet <URL:http://www.3gpp.org/ftp/tsg_ran/WG1_RL1/TSGR1_83/Docs/R1, R 1 - 156946 (documents showing well-known arts) 156946.zip>, Nov. 6, 2015.
Alcatel-Lucent Shanghai Bell et al., "Design of Scheduling Assignment," R1-142050, 3GPP TSG RAN WG1 Meeting #77, Seoul, Korea, May 19-23, 2014, pp. 1-4.
Anritsu Ltd. et al., "Update 7.1.7.x test cases with UE Category 11 and 12 information," R5-155783, 3GPP TSG-RAN WG5 Meeting #69, Anaheim, USA, Nov. 16-20, 2015, pp. 1-98.
Ericsson, "Mixed Numerology in an OFDM System," R1-165833, 3GPP TSG RAN WG1 Meeting #85, Nanjing, May 23-27, 2016, pp. 1-9.
Panasonic, "Resource allocation of PDSCH for Rel.13 MTC," R1-156946, 3GPP TSG RAN WG1 Meeting #83, Anaheim, USA, Nov. 15-22, 2015, pp. 1-3.
Qualcomm Europe [TSG-RAN WG1], "[Draft] LS Response to Semi-Persistent Scheduling Activation with single PDCCH," R1-083782, 3GPP TSG RAN WG1 Meeting #54bis, Prague, Czech, Sep. 29-Oct. 3, 2008, pp. 1-2.

* cited by examiner

METHOD AND TRANSMITTER FOR ALLOCATING RESOURCES TO TERMINAL IN TELECOMMUNICATION SYSTEM

TECHNICAL FIELD

The present invention generally relates to resource allocation to terminals in a telecommunication system which comprises a carrier when this carrier supports multiple subcarrier spacing configurations.

BACKGROUND ART

The present invention applies in multicarrier telecommunication systems such using OFDMA, or SC-FDMA or other OFDM-based waveform. Some OFDM-based systems allow several parameters sets, sometimes referred to as "numerology", to coexist onto the same carrier. This is especially the case in the 5G systems such as the NR (New Radio) standard under definition in 3GPP. A numerology may include parameters such as the subcarrier spacing configuration, the size of the cyclic prefix, the number of symbols, etc. Thus on a carrier with a given bandwidth, different subcarrier spacing configurations can coexist, in a frequency domain multiplexing manner.

SUMMARY OF INVENTION

This coexistence of different subcarrier spacing configurations causes difficulties in the resource allocation in such a carrier. Indeed, when allocating contiguous groups of subcarriers of different subcarrier spacing configuration, performance degradation can occur due to inter-numerology interference. More specifically, subcarriers of the same numerology respect an orthogonality property, that is the sinc-shaped subcarrier spectra exhibit zero-crossings at the positions of the other subcarriers. This orthogonality property may not be preserved between contiguous subcarriers of different subcarrier spacing configuration, causing inter-numerology interference.

Generally, to limit the signaling overhead, carriers are allocated with a certain granularity N. Groups of N subcarriers are called resource blocks: For example, in LTE/LTE-A/NR N=12. By resource blocks we refer more generally to the smallest scheduling unit of the carrier, which in this example contains 12 subcarriers in the frequency domain across a fixed number of OFDM symbols in the time domain.

Users are allocated a certain number of resource blocks for their communication needs. When users having different numerologies are allocated resource blocks in neighbouring frequency bands, inter-numerology interference can appear. To limit the impact of inter-numerology interference, guard bands can be inserted, during the scheduling process, in the frequency domain between two resource blocks of two different numerologies. That is by leaving unallocated resources between these two resource blocks. On the other hand, inserting a guard band leads to loss of resources in the carrier. Indeed, when allocating a resource block contiguously to a resource block with a different numerology the possibility in setting the size of the guard band depends on the subcarrier spacing configuration of the resource block being scheduled, which can strongly affect the spectral efficiency.

Figure 2A:
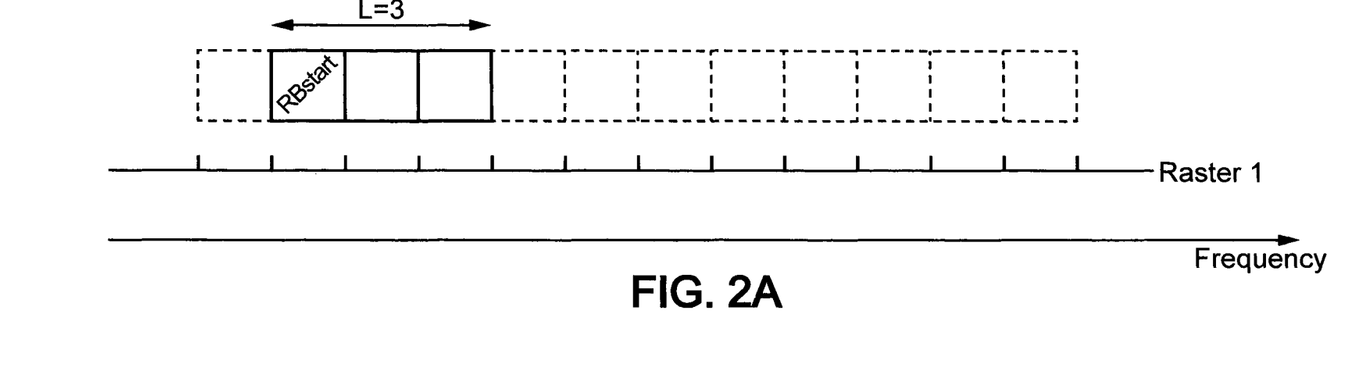
FIG. 2A schematizes a usual resource block scheduling in a carrier where only one numerology is defined.
Figure 2B:
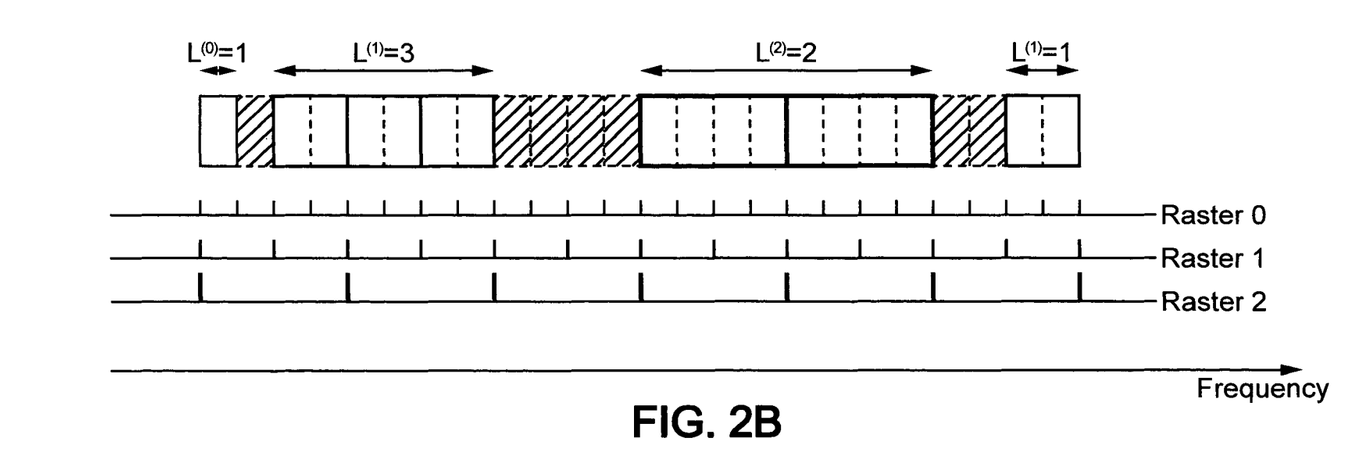
FIG. 2B schematizes a usual resource block scheduling in a carrier where several subcarrier spacing configurations coexists usually.

For example and like displayed in FIG. 2B, we consider three subcarrier spacing configurations defined by $\Delta f_0$, $\Delta f_1$ and $\Delta f_2$ with $4\Delta f_0 = 2\Delta f_1 = \Delta f_2$ and an allocation of resource blocks in those three numerologies. These resource blocks are distinguished by the thickness of their outline, thick for the resource blocks of subcarrier spacing configuration $\Delta f_2$, fine for the resource blocks of subcarrier spacing configuration $\Delta f_0$ and intermediate for the resource blocks of subcarrier spacing configuration $f_1$.

For each numerology and more specifically for each subcarrier spacing configuration there is a raster in the frequency domain defining the possible positions of the subcarriers in the said subcarrier spacing configuration. The pitch of the raster corresponds to the size of a resource block of the same numerology in the frequency domain.

The scheduling in such a carrier is done taking into account the raster of each numerology, indeed each resource block of a defined numerology fills a socket of the same numerology raster.

Since we allocate resource blocks aligned on their own raster, the guard band (represented by shaded areas in FIG. 2B) is at least the size of one of the resource blocks on either side of the guard band. Therefore it can lead to an excessive resource waste when inserting a guard band, especially when the two different subcarrier spacing configurations of the resource blocks on either side of the guard band are both high.

The present invention aims to improve the situation.

To that end, the invention relates to a method for allocating resources to a terminal in a telecommunication system comprising at least a carrier comprising several subcarriers, this carrier supporting at least one subcarrier spacing configuration $\Delta f_0$ and one subcarrier spacing configuration $\Delta f_1$, with $\Delta f_1 = q \cdot \Delta f_0$, and q being a positive integer, said method comprising:

a) selecting the subcarrier spacing configuration $\Delta f_1$;
b) determining a number L of resource blocks having subcarriers of said subcarrier spacing configuration $\Delta f_1$;
c) allocating to said terminal subcarriers among the subcarriers of subcarrier spacing configurations $\Delta f_1$, of the carrier, having their frequencies:

greater or equal to a frequency, namely $f_{start}$, being the lowest frequency among frequencies of subcarriers with subcarrier spacing configuration $\Delta f_1$ having a frequency higher than or equal to $f_{ref} + m \cdot N \cdot \Delta f_1 + k \cdot N \cdot \Delta f_0$, $f_{ref}$ being the lowest frequency among the subcarriers that are allowable for subcarrier spacing $\Delta f_1$ in the carrier, k being an integer greater or equal to 1 and lesser or equal to (q−1), N being the number of subcarriers in a resource block, m being an integer greater or equal to 0 and lesser than a maximum number of resource blocks, allowable in the carrier, having subcarriers of subcarrier spacing configuration $\Delta f_1$;

lesser or equal to a frequency $f_{ref} + m \cdot N \cdot \Delta f_1 + (L \cdot N - 1) \cdot \Delta f_1$, namely $f_{last}$.

The present invention, within the resource allocation in a carrier which supports several subcarrier spacing configurations, enables to allocate to the terminal only some subcarriers of a resource block. More specifically, allocating to the terminal, among the N subcarriers of the resource block, only the subcarriers after the $n^{th}$. This enables to define a guard band between two allocations of resource of different subcarrier spacing configurations by not allocating the first subcarriers of the resource block of subcarrier spacing configuration $\Delta f_1$. More specifically, when allocating resource blocks of a specific subcarrier spacing configurations, aligned on their own raster, to a terminal a guard band is implemented when the previous resources, in frequency, are allocated in a different subcarrier spacing configuration to avoid inter-numerology interference. The method enables the first subcarrier allocated to the terminal to be different from the first subcarrier of the resource block of the same subcarrier spacing configuration, to which the first subcarrier allocated belongs. That is the firsts subcarriers of this resource block are not allocated to the terminal. By leaving vacant these first subcarriers, this enables to give some flexibility in the size of the guard band, therefore it enables to reduce the inter-numerology interference while leaving vacant only a small appropriate amount of frequency resources. Indeed, the present invention enables to set the size of a guard band with a granularity of $N*\Delta f_0$ in contrary to a granularity of $N*\Delta f_1$, therefore it enables to have a better spectral efficiency. Also, the present invention enables to set the size of a guard band with a granularity of $N*\Delta f_0$ in contrary to a granularity of $\min(N*\Delta f_1, N*\Delta f_2)$ with $\Delta f_0 < \min(\Delta f_1, \Delta f_2)$ between users using subcarrier spacings $\Delta f_1$ and $\Delta f_2$; therefore it enables to have a better spectral efficiency. The subcarrier spacing configuration $\Delta f_0$ may or may not be used effectively for resource allocation. For example, $\Delta f_0$ may be smaller than $\Delta f_1$ and $\Delta f_2$ or the smallest subcarrier spacing configuration supported for resource allocation on the carrier. For example, $\Delta f_0$ may be the smallest subcarrier spacing configuration defined in the telecommunication system, even if it is not used on the carrier.

The present invention matches the fact of allocating contiguous resource blocks to the same terminal with the fact of defining a guard band with respect to the previous adjacent frequency domain allocation by leaving vacant the first subcarriers of the first resource block allocated to the terminal. Such an allocation scheme which allocates a specific number L of contiguous resource blocks to the same terminal, is done by specifying the position of the first subcarrier not vacant in the first resource block allocated to the terminal and the number L of the resource blocks allocated. Only the first resource block allocated to the terminal according to the method is not complete in regard to the number of subcarrier allocated through it.

By resource blocks the present invention refers as well to virtual resource blocks or to physical resource blocks. Resource blocks also refer to any other resource allocation unit, such as resource block groups which encompass several resource blocks, or to a group of any pre-defined number of subcarriers.

According to an aspect of the invention, the integer m is determined such as at least one subcarrier of subcarrier spacing configurations $\Delta f_1$, having a frequency of at least $f_{ref}+m \cdot N \cdot \Delta f_1$ and at the most $f_{ref}+(m+1) \cdot N \cdot \Delta f_1 - \Delta f_1$, can be allocated to the terminal. This enables to avoid leaving an unnecessary number of unallocated subcarriers of the subcarrier spacing configuration $\Delta f_1$ when resource blocks of a smaller subcarrier spacing configuration than $\Delta f_1$ are allocated. Indeed, the subcarriers of subcarrier spacing configuration $\Delta f_1$ between these small resource blocks and the following resource block of subcarrier spacing configuration $\Delta f_1$, due to the invention can be allocated. Therefore this enables to maximize the spectral efficiency.

According to an aspect of the invention, the integer k is determined such as $f_{start}-f_{near}$ is greater than G, G being a strictly positive threshold, and $f_{near}$ being a frequency of a subcarrier of a subcarrier spacing configuration different from $\Delta f_1$, said subcarrier having the highest frequency among frequencies of subcarriers allocated in the carrier having subcarrier spacing configurations different from $\Delta f_1$ and having lower frequencies than $f_{ref}+(m+1) \cdot N \cdot \Delta f_1$. This enables to implement the required size of the guard band to maintain the orthogonality property between two subcarriers of different subcarrier spacing configuration.

According to an aspect of the invention, the subcarrier spacing configuration $\Delta f_0$ is the smallest subcarrier spacing configuration among the subcarrier spacing configurations supported by the carrier. This enables to implement guard bands, whose size can be define with high flexibility. More specifically, the subcarrier spacing configuration $\Delta f_0$ will always be at least equal or smaller than the subcarrier spacing configurations of any of two subcarriers between which a guard band is inserted. Therefore the size of the guard band can be set short enough to maximize the spectral efficiency.

It is also possible to define a virtual subcarrier spacing configuration supported by the carrier, which is equal to $\Delta f_0'=\Delta f_0/N$. Therefore, the granularity of the implementation of the guard band is of $N*\Delta f_0'=\Delta f_0$ which offers a granularity to set the size of the guard band of one subcarrier of subcarrier spacing configurations $\Delta f_0$. The smaller $\Delta f_0$ is chosen the more accurately the size of the guard band can be chosen with the cost of a higher signaling overhead.

According to an aspect of the invention, the number L, $L \geq 1$, satisfies to:

$$q \cdot L + NRB_{start}^{(0)} \leq N_{RB}^{(0)}$$

where:

$N_{RB}^{(0)}$ is a maximum number of resource blocks comprising N subcarriers of the subcarrier spacing configuration $\Delta f_0$ that are allowable in said carrier during a time period of a resource block comprising N subcarriers of said first subcarrier spacing configuration $\Delta f_0$, $NRB_{start}^{(0)}$ is a maximum number of resource blocks comprising N subcarriers of the subcarrier spacing configuration $\Delta f_0$ that are allowable in said carrier during a time period of a resource block comprising N subcarriers of said subcarrier spacing configuration $\Delta f_0$, said resource blocks having all their subcarriers frequencies lower than said frequency $f_{start}$.

If $f_{ref}$ is also the lowest frequency among the subcarriers that are allowable for subcarrier spacing $\Delta f_0$ in the carrier, then $$NRB_{start}^{(0)} = \left\lfloor \frac{f_{start}-f_{ref}}{N \cdot \Delta f_0} \right\rfloor = mq+k.$$

Indeed, the reference frequency ($f_{ref}^{(i)}$) of each numerology can be different, these cases are covered by the present invention.

Alternatively the size L could be understood as excluding the resource block containing the guard band. Therefore in this specific case the L values starts with the value 0. Deducing equivalent formulae when L is understood as excluding the resource block containing the guard band based on the current description which considers L as including the resource block containing the guard band is straightforward.

According to an aspect of the invention, the method further comprises the step of sending to the terminal allocation information based on the subcarriers allocated to the terminal. This enables the terminal to be informed of which subcarriers of the subcarrier spacing configuration $\Delta f_1$ are allocated to it.

According to an aspect of the invention the allocation information sent to the terminal is a resource indication value, RIV, which is an integer and a function of L and $NRB_{start}^{(0)}$. Since for a $f_{start}$ there is one $NRB_{start}^{(0)}$ and for a $f_{last}$, depending on the $f_{start}$ there is a L, for each allocation of contiguous subcarriers of the same subcarrier spacing configuration achieved according to the invention there exist one couple $NRB_{start}^{(0)}$ and L an therefore at least a RIV value.

Based on each couple of $NRB_{start}^{(0)}$ and L, the terminal can recover $f_{start}$ and $f_{last}$, $f_{start}$ being the lowest frequency among frequencies of subcarriers with subcarrier spacing configuration $\Delta f_1$ having a frequency higher than the frequency of the subcarrier with subcarrier spacing configuration $\Delta f_0$ allowable with the highest frequency among the subcarriers of the $NRB_{start}^{(0)}$ resource blocks comprising N subcarriers of the subcarrier spacing configuration $\Delta f_0$ defined above, and $f_{last}$ being the frequency $f_{ref}+m \cdot N \cdot \Delta f_1 + (L \cdot N-1) \cdot \Delta f_1$, where m can be recovered with $f_{start}$, $(m=\lfloor (f_{start}-f_{ref})/N \cdot \Delta f1 \rfloor)$.

According to an aspect of the invention, the RIV function is an injective function of any couple comprising L and $NRB_{start}^{(0)}$ values. This enables the terminal which receives a RIV value according to the resources that have been allocated to it, to decode a unique couple $NRB_{start}^{(0)}$ and L.

According to an aspect of the invention, the RIV is a surjective function among the integers from 0 to the maximum value taken by RIV. This ensure that the maximum value taken by RIV when going through the different possible resource allocation according to the invention, that is the different pairs of L and $NRB_{start}^{(0)}$ values with $qL+NRB_{start}^{(0)} \leq N_{RB}^{(0)}$, is the lowest possible. This enables to reduce the number of bits necessary for signaling all the possible resource allocations achieved according to the invention.

According to an aspect of the invention, the RIV is defined by:

$$\begin{cases} RIV = (L-1) + p_1 * NRB_{start}^{(0)} & \text{if } NRB_{start}^{(0)} \leq r_1 + 1 + \lceil \frac{1}{2} * q * (p_1 - 1) \rceil \\ RIV = p_1 * (r_1 + 1 + N_{RB}^{(0)} - q - NRB_{start}^{(0)}) + p_1 - L & \text{otherwise} \end{cases}$$

Where:
$r_1$ is a remainder of the division of $N_{RB}^{(0)}$ by q $$p_1 = \left\lfloor \frac{N_{RB}^{(0)}}{q} \right\rfloor$$

This enables a transmitter to code at least a RIV value for each resource allocation achieved according to the invention, this coding being of low complexity.

In addition this enables the terminal which receives a RIV value according to the resources that have been allocated to it to decode a couple of values $NRB_{start}^{(0)}$ and L.

Indeed the terminal obtains data related to the subcarrier spacing configuration (for example: $\Delta f_1$ and $\Delta f_0$, $\Delta f_1$ and q or $\Delta f_0$ and q) of the resource blocks that are allocated to it and of the carrier band with respect to another numerology $N_{RB}^{(0)}$. When the terminal further receives the RIV value, the terminal can then decode the couple $NRB_{start}^{(0)}$ and the L as it follows:

based on $N_{RB}^{(0)}$ and q, the terminal computes:

$$p_1 = \left\lfloor \frac{N_{RB}^{(0)}}{q} \right\rfloor,$$

with $\lfloor x \rfloor$ being the floor function and $\lceil x \rceil$ being the ceiling function; and $r_1 = \text{rem}(N_{RB}^{(0)}, q)$, with rem(Y;X) being the remainder of the division of Y by X.

based on reception of its RIV value the terminal computes:

$$P = \left\lfloor \frac{RIV}{p_1} \right\rfloor;$$

and
R=rem (RIV, $p_1$); and $$NRB_{start}^{(0)} = \begin{cases} P & \text{if } P + q*(R+1) \leq N_{RB}^{(0)} \\ N_{RB}^{(0)} - q + r_1 + 1 - P & \text{otherwise} \end{cases}$$

$$L = \begin{cases} R+1 & \text{if } P + q*(R+1) \leq N_{RB}^{(0)} \\ p_1 + R & \text{otherwise} \end{cases}$$

Based on the values $NRB_{start}^{(0)}$ and L, decoded by the terminal, the terminal can determine a unique $f_{start}$ and a unique $f_{last}$ as shown above.

According to an aspect of the invention, the RIV is defined by:

$$\begin{cases} RIV = (L-1)(r_1+1+\lceil (p_1-1)*\frac{q}{2} \rceil + & \text{if } NRB_{start}^{(0)} \leq r_1 + \\ \quad 1) + NRB_{start}^{(0)} & 1 + \lceil (p_1-1)*\frac{q}{2} \rceil \\ RIV = (p_1-L)*(r_1+1+\lceil (p_1-1)*\frac{q}{2} \rceil + & \text{otherwise} \\ \quad 1) + (r_1+1+N_{RB}^{(0)} - q - NRB_{start}^{(0)}) & \end{cases}$$

Where:
$r_1$ is a remainder of the division of $N_{RB}^{(0)}$ by q $$p_1 = \left\lfloor \frac{N_{RB}^{(0)}}{q} \right\rfloor$$

This enables a transmitter to code at least a RIV value for each resource allocation achieved according to the invention, this coding being of low complexity.

In addition this enables the terminal which receives a RIV value according to the resources that have been allocated to it to decode a couple of values $NRB_{start}^{(0)}$ and L.

Indeed the terminal obtains data related to the subcarrier spacing configuration (for example: $\Delta f_1$ and $\Delta f_0$, $\Delta f_1$ and q or $\Delta f_0$ and q) of the resource blocks that are allocated to it and of the carrier band with respect to another numerology $N_{RB}^{(0)}$. When the terminal further receives the RIV value, the terminal can then decode the couple $NRB_{start}^{(0)}$ and the L as follows:

based on $N_{RB}^{(0)}$ and q, the terminal computes:

$$p_1 = \left\lfloor \frac{N_{RB}^{(0)}}{q} \right\rfloor,$$

with $\lfloor x \rfloor$ being the floor function and $\lceil x \rceil$ being the ceiling function; and $r_1 = \text{rem}(N_{RB}^{(0)}, q)$, with $\text{rem}(Y;X)$ being the remainder of the division of Y by X; and $$N = r_1 + 1 + \left\lceil (p_1 - 1) * \frac{q}{2} \right\rceil.$$

based on reception of its RIV value the terminal computes:

$$P = \left\lfloor \frac{RIV}{N+1} \right\rfloor; \text{ and}$$

$$R = \text{rem}(RIV, N+1); \text{ and}$$

$$NRB_{start}^{(0)} = \begin{cases} R & \text{if } R + q*(P+1) \le N_{RB}^{(0)} \\ N_{RB}^{(0)} - q + r_1 + 1 - R & \text{otherwise} \end{cases}$$

$$L = \begin{cases} P+1 & \text{if } R + q*(P+1) \le N_{RB}^{(0)} \\ p_1 - P & \text{otherwise} \end{cases}$$

Based on the values $NRB_{start}^{(0)}$ and L, decoded by the terminal, the terminal can determine a unique $f_{start}$ and a unique $f_{last}$ as shown above.

According to an aspect of the invention, the RIV is defined by:

$$\begin{cases} RIV = (L-1)(N_{RB}^{(0)} - q + r_1 + 2) + & \text{if } L \le \lceil p_1/2 \rceil \\ \quad NRB_{start}^{(0)} \\ RIV = (p_1 - L)*(N_{RB}^{(0)} - q + r_1 + 2) + & \text{otherwise} \\ \quad (N_{RB}^{(0)} - q + r_1 + 1 - NRB_{start}^{(0)}) \end{cases}$$

Where:
$r_1$ is a remainder of the division of $N_{RB}^{(0)}$ by q $$p_1 = \left\lfloor \frac{N_{RB}^{(0)}}{q} \right\rfloor$$

This enables a transmitter to code at least a RIV value for each resource allocation achieved according to the invention, this coding being of low complexity.

In addition this enables the terminal which receives a RIV value according to the resources that have been allocated to it to decode a couple of values $NRB_{start}^{(0)}$ and L.

Indeed the terminal obtains data related to the subcarrier spacing configuration (for example: $\Delta f_1$ and $\Delta f_0$, $\Delta f_1$ and q or $\Delta f_0$ and q) of the resource blocks that are allocated to it and of the carrier band with respect to another numerology $N_{RB}^{(0)}$. When the terminal further receives the RIV value, the terminal can then decode the couple $NRB_{start}^{(0)}$ and the L as follows:

based on N and q, the terminal computes:

$$p_1 = \left\lfloor \frac{N_{RB}^{(0)}}{q} \right\rfloor;$$

and
$r_1 = \text{rem}(N_{RB}^{(0)}, q)$, rem(Y;X) being the remainder of the division of Y by X.

based on reception of its RIV value the terminal computes:

$$P = \left\lfloor \frac{RIV}{N_{RB}^{(0)} - q + r + 2} \right\rfloor; \text{ and}$$

$$R = \text{rem}(RIV, N_{RB}^{(0)} - q + r_1 + 2); \text{ and}$$

$$NRB_{start}^{(0)} = \begin{cases} R & \text{if } R + q*(P+1) \le N_{RB}^{(0)} \\ N_{RB}^{(0)} - q + r_1 + 1 - R & \text{otherwise} \end{cases}$$

$$L = \begin{cases} P+1 & \text{if } R + q*(P+1) \le N_{RB}^{(0)} \\ p_1 - P & \text{otherwise} \end{cases}$$

Based on the values $NRB_{start}^{(0)}$ and L, decoded by the terminal, the terminal can determine a unique $f_{start}$ and a unique $f_{last}$ as shown above.

According to an aspect of the invention, the RIV is defined by:

$$RIV = \left(\sum_{l=1}^{L-1} S_l\right) + NRB_{start}^{(0)} = (L-1)*(N_{RB}^{(0)} + 1) - \frac{q*L*(L-1)}{2} + NRB_{start}^{(0)}$$

Where:
$S_l = N_{RB}^{(0)} - q*l + 1$

This enables the transmitter to code a RIV value for each resource allocation achieved according to the invention, this coding being of lower complexity than the coding of the RIVs previously defined, but in return the decoding of the couple $NRB_{start}^{(0)}$ and the L by the terminal which receives the RIV value is more complex than the decoding of the previous RIV.

Indeed the terminal obtains data related to the subcarrier spacing configuration (for example: $\Delta f_1$ and $\Delta f_0$, $\Delta f_1$ and q or $\Delta f_0$ and q) of the resource blocks that are allocated to it and of the carrier band with respect to another numerology $N_{RB}^{(0)}$. When the terminal further receives the RIV value, the terminal can then decode the couple $NRB_{start}^{(0)}$ and the L as follows:

based on $N_{RB}^{(0)}$, q and the RIV value the terminal received, the terminal calculates the value M such as:

$$\sum_{l=1}^{M-1} S_l \le RIV < \sum_{l=1}^{M} S_l$$

then the terminal calculates $NRB_{start}^{(0)}$ and L as follows:

$$\begin{cases} NRB_{start}^{(0)} = RIV - \sum_{l=1}^{M-1} S_l \\ L = M \end{cases}$$

Based on the values $NRB_{start}^{(0)}$ and L, decoded by the terminal, the terminal can determine a unique $f_{start}$ and a unique $f_{last}$ as shown above.

Like previously mentioned the decoding of this RIV is more complex since each time the terminal decodes the RIV it needs to calculate the sums $\sum_{l=1}^{M-1} S_l$ or at least load it from a lookup table which requires more calculating resource to decode and/or more memory storage than the previous RIV.

According to an aspect of the invention, the carrier, the resource allocation and the terminal are defined according to a wireless communication protocol being a 5G protocol.

According to an aspect of the invention, the carrier, the resource allocation and the terminal are defined according to a wireless communication protocol being a New Radio standard according to 3GPP standard.

A second aspect of the invention concerns a transmitter configured for allocating resource to a terminal in a telecommunication system comprising at least a carrier comprising several subcarriers, said carrier supporting at least one subcarrier spacing configuration $\Delta f_0$ and one subcarrier spacing configuration $\Delta f_1$, with $\Delta f_1 = q \cdot \Delta f_0$, q being a positive integer, said transmitter being configured to perform:

a) selecting the subcarrier spacing configuration $\Delta f_1$;
b) determining a number L of resource blocks having subcarriers of said subcarrier spacing configuration $\Delta f_1$;
c) allocating to said terminal subcarriers among the subcarriers of the carrier of subcarrier spacing configurations $\Delta f_1$, having their frequencies:

greater or equal to a frequency, namely $f_{start}$, being the lowest frequency among frequencies of subcarriers of subcarrier spacing configuration $\Delta f_1$ having a frequency higher than or equal to $f_{ref} + m \cdot N \cdot \Delta f_1 + k \cdot N \cdot \Delta f_0$,
$f_{ref}$ being the lowest frequency among the subcarriers that are allowable for subcarrier spacing $\Delta f_1$ in the carrier,
k being an integer greater or equal to 1 and lesser or equal to (q−1),
N being the number of subcarriers in a resource block,
m being an integer greater or equal to 0 and lesser than a maximum number of resource block, allowable in the carrier, having subcarriers of subcarrier spacing configuration $\Delta f_1$;

lesser or equal to a frequency $f_{ref} + m \cdot N \cdot \Delta f_1 + (L \cdot N - 1) \cdot \Delta f_1$, namely $f_{last}$.

According to an aspect of the invention, the transmitter comprises a memory unit storing, for each couple of possible values of a number $NRB_{start}^{(0)}$ and said L a unique resource indication value RIV, $NRB_{start}^{(0)}$ being a maximum number of resource blocks comprising N subcarriers of the subcarrier spacing configuration $\Delta f_0$ that are allowable in said carrier during a time period of a resource block comprising N subcarriers of said subcarrier spacing configuration $\Delta f_0$, said resource blocks having all their subcarriers frequencies lower than said frequency $f_{start}$.

More particularly, the transmitter is further configured to:
provide a RIV value based on a couple of L and $NRB_{start}^{(0)}$ corresponding to the allocation of subcarriers performed by the transmitter, and
transmit the RIV to the terminal.

For example the processor of the transmitter can enter the values of a number $NRB_{start}^{(0)}$ and L in a lookup table corresponding to the subcarrier spacing configuration $\Delta f_0$ of the subcarriers that are allocated to it and to the carrier band with respect to another numerology $N_{RB}^{(0)}$, which provides in return the corresponding RIV value.

According to an alternative of the aspect of the invention where the memory unit has in its memory for each couple of possible values of a number $NRB_{start}^{(0)}$ and L a unique resource indication value RIV, the processor can calculate the RIV by applying the formulas mentioned above.

A third aspect of the invention concerns a terminal, in a telecommunication system, configured to use allocated resources in a carrier, said resources having been allocated according to anyone of claims 1 to 13, comprises:

a communication module configured to receive a resource allocation information through a control channel,
a processing module which is configured to determine the subcarriers that are allocated to said terminal according to the resource allocation information, wherein the processing module is configured to determine said subcarriers of subcarrier spacing configurations $\Delta f_1$ allocated to the terminal:

as having their frequencies greater or equal to $f_{start}$, and
as having their frequencies lesser or equal to $f_{last}$.

According to an alternative the terminal further comprises a memory unit storing for each couple of possible values of a number $NRB_{start}^{(0)}$ and said L a unique resource indication value RIV, $NRB_{start}^{(0)}$ being a maximum number of resource blocks comprising N subcarriers of the first subcarrier spacing configuration $\Delta f_0$ that are allowable in said carrier during a time period of a resource block comprising N subcarriers of said subcarrier spacing configuration $\Delta f_0$, said resource blocks having all their subcarriers frequencies lower than said frequency $f_{start}$, and more particularly the processing module is configured to read said memory unit and determine the couple values L and $NRB_{start}^{(0)}$ and recover $f_{start}$ and $f_{last}$, upon reception of an RIV value in said resource allocation information.

For example the processing module of the terminal enters the RIV value that he received in a lookup table corresponding to the subcarrier spacing configuration $\Delta f_0$ of the subcarriers that are allocated to it, and to the carrier band with respect to another numerology $N_{RB}^{(0)}$, which provides in return the corresponding couple of a number $NRB_{start}^{(0)}$ and L values.

According to the present invention the terminal encompasses all types of terminals, for instance mobile phones, vehicle communication systems and all kinds of connected devices and more generally all end systems.

According to an alternative of the aspect of the invention where the memory unit has in its memory for each couple of possible values of a number $NRB_{start}^{(0)}$ and L a unique resource indication value RIV, the processing module can calculate the couple of a number $NRB_{start}^{(0)}$ and L values by applying the calculating steps mentioned above which enables to calculate a number $NRB_{start}^{(0)}$ and a number L corresponding to a specific RIV.

For example the terminal receives the RIV and based on the knowledge of $N_{RB}^{(0)}$ and q and on the RIV value the terminal received, the processing module calculates the value M such as:

$$\sum_{l=1}^{M-1} S_l \leq RIV < \sum_{l=1}^{M} S_l$$

Then the processing module calculates $NRB_{start}^{(0)}$ and L as follows:

$$\begin{cases} NRB_{start}^{(0)} = RIV - \sum_{l=1}^{M-1} S_l \\ L = M \end{cases}$$

Based on the values $NRB_{start}^{(0)}$ and L, decoded by the terminal, the terminal can determine a unique $f_{start}$ and a unique $f_{last}$ as shown above.

A fourth aspect of the invention concerns a computer program product comprising code instructions to perform the method as describe previously when said instructions are run by a processor.

The present invention is illustrated by way of example, and not by way of limitation, in the figures of the accompanying drawings, in which like reference numerals refer to similar elements and in which:

DESCRIPTION OF EMBODIMENTS

Figure 1:
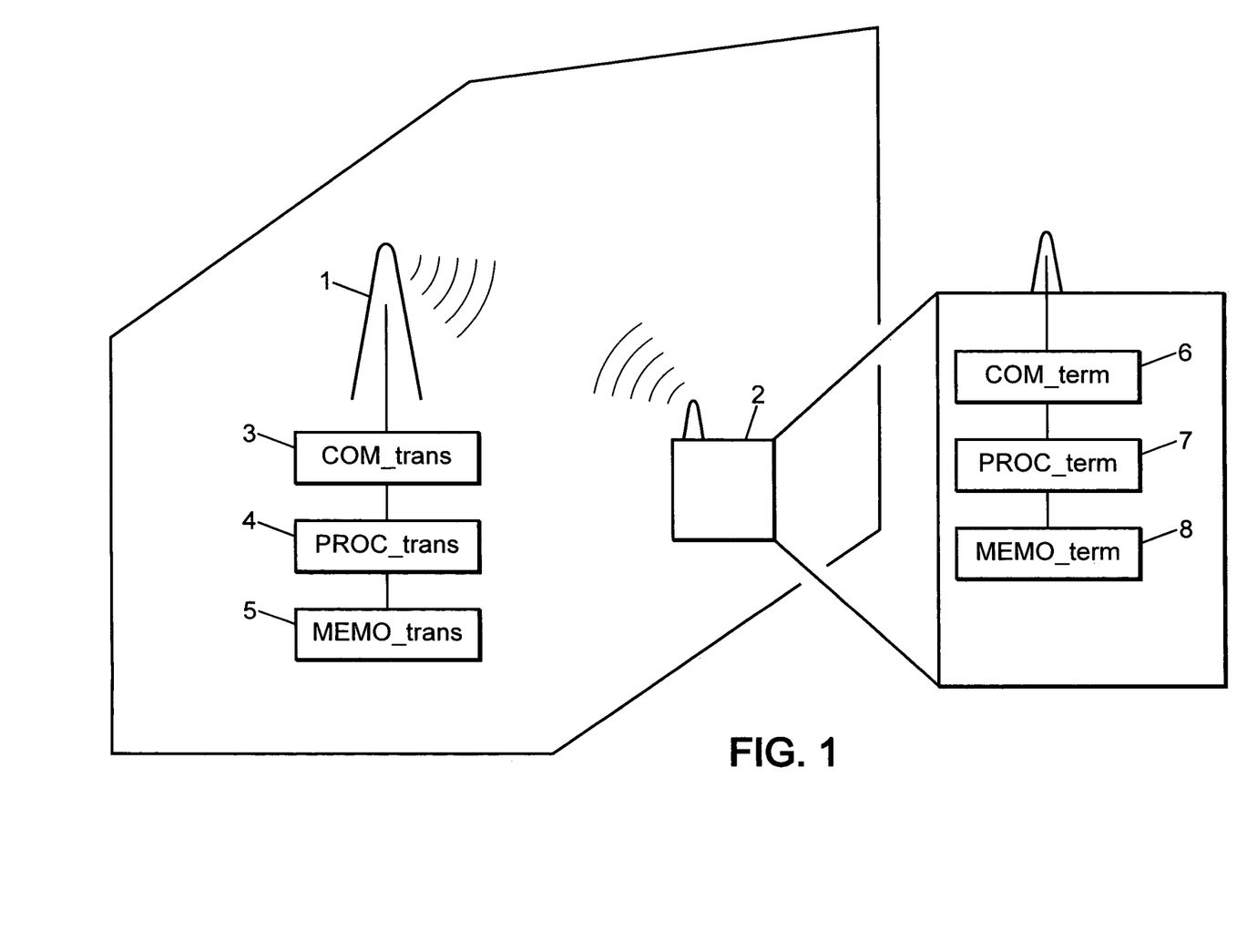
FIG. 1 illustrates a transmitter and a terminal to which resources are allocated.

Referring to FIG. 1, there is shown a transmitter 1, for example in the OFDM-based 5G system like NR, a base station BS and a terminal in the cell of the transmitter. The terminal 2, for example in the OFDM-based 5G system like NR a user equipment UE, is allocated resources by the base station.

The transmitter 1 comprises one communication module (COM_trans) 3, one processing module (PROC_trans) 4 and a memory unit (MEMO_trans) 5. The MEMO_trans 5 comprises a non-volatile unit which retrieves the computer program and a volatile unit which retrieves the allocation parameters. The PROC_trans which is configured to determine the resource allocation information, such as a RIV value, according to the resource blocks that are allocated to the terminal. The COM_trans is configured to transmit to the terminal the resource allocation information.

The terminal comprises one communication module (COM_term) 6, one processing module (PROC_term) 7 and a memory unit (MEMO_term) 8. The MEMO_term 8 comprises a non-volatile unit which retrieves the computer program and a volatile unit which retrieves the parameters of the carrier and the resource allocation information. The PROC_term 7 is configured to determine the subcarriers that are allocated to the terminal according to the resource allocation information. The COM_term 6 is configured to receive from the transmitter a resource allocation information.

In the following, only part of the carrier band or part of a pre-defined portion of the carrier band is represented.

Referring to FIG. 2A, there is shown part of a carrier where only one numerology is defined and where resource blocks from this numerology are scheduled. The boxes represent resource blocks containing 12 subcarriers in the frequency domain across a fixed number of OFDM symbols in the time domain. For example in LTE a carrier may have a bandwidth of 1.4 MHz, 3 MHz, 5 MHz, 10 MHz, 15 MHz, or 20 MHz. Around 90% of this bandwidth is effectively used for the communication needs. In the frequency domain, groups of subcarriers are allocated to a terminal in the resource allocation process. In the LTE/LTE-Advanced subcarriers are grouped into resource blocks (RB) of 12 subcarriers each. The resource block defines the resource allocation granularity, in the sense where a user is allocated a certain number of resource blocks, and therefore a certain bandwidth. In the LTE/LTE-Advanced the subcarrier spacing, that is the frequency spacing between two adjacent subcarrier, is fixed to 15 kHz. Therefore the frequency bandwidth of a resource block is fixed and the possible number of resource blocks in a carrier is only dependent on the carrier bandwidth.

To a numerology and more specifically to a subcarrier spacing configuration corresponds a raster, in which the socket of the raster corresponds to the size of a resource block of the same numerology in the frequency domain. All the resource blocks are scheduled aligned on this raster. Each potential resource block aligned on the raster is indexed to an integer number. For example in the logical region each of the $N_{RB}$ virtual resource blocks is numbered from 0 to $N_{RB}-1$. Several scheme of allocation exist, for example in LTE/LTE-A resource allocation type 2 is a compact format indicating to a terminal a set of contiguously virtual resource blocks which are allocated to it for downlink or uplink transfer. Therefore a resource indication value (RIV) corresponding to the number $NRB_{start}$ of the first contiguous resource block $RB_{start}$ allocated to the terminal and a length L in terms of virtually contiguously allocated resource blocks, is sent to the terminal. The RIV may be defined by:

$$RIV = N_{RB}(L-1) + NRB_{start} \text{ if } (L-1) \leq \lfloor N/2 \rfloor,$$

$$RIV = N_{RB}(N_{RB}-L+1) + (N_{RB}-1-NRB_{start}), \text{ otherwise}.$$

Where $NRB_{start}$ is the number corresponding to the position of $RB_{start}$.

The RIV value enables the terminal to decode the position of the first virtual resource block $RB_{start}$ which is allocated to it and the number of virtually contiguous resource blocks that are allocated to the terminal. Once $RB_{start}$ and L are decoded the terminal is able to define the resource blocks that where allocated to it. In the example of FIG. 2A, L is equal to 3 and only 3 resource blocks are allocated, the potential resource blocks are materialized by dotted line squares.

Referring to FIG. 2B, there is shown part of a carrier where several subcarrier spacing configurations coexists and where resource blocks from three of these different numerologies are scheduled. This is especially possible in a OFDM-based 5G system like NR (New Radio) standard. For example in the FIG. 2B, three subcarrier spacing configurations coexists which are $\Delta f_0$, $\Delta f_1$ and $\Delta f_2$. BW is the effectively occupied bandwidth of the carrier. The maximum number of resource blocks of a specific numerology that are allowable in the carrier is $$N_{RB}^{(i)} = \left\lfloor \frac{BW}{\Delta f_i} \right\rfloor.$$

It should be noted that for certain subcarrier spacing configurations one extra RB can exist if fractional RBs containing less than N subcarriers are allowed for example at band edge. For the numerical example $\{\Delta f_0, \Delta f_1, \Delta f_2\} = \{kHz, 30 \text{ kHz}, 60 \text{ kHz}\}$ and with N=12 subcarriers per resource block. The boxes represent resource blocks containing 12 subcarriers in the frequency domain FIG. 2B shows a scheduling of resource blocks in three different subcarrier spacing configurations. Boxes of one rectangle and with fine outlines represent resource blocks of subcarrier spacing configuration $\Delta f_0$, boxes of two rectangles and with medium outlines represent resource blocks of subcarrier spacing configuration $\Delta f_1$ and boxes of four rectangles and with thick outlines represent resource blocks of subcarrier spacing configuration $\Delta f_2$. Each resource block is aligned on its raster. Therefore, the first subcarrier of each resource block is on the raster of the corresponding subcarrier spacing configuration. All the subcarriers of the resource block are then allocated to a same terminal. If the allocation is compact, then the L contiguous resource blocks are allocated to the same terminal, that is all the subcarriers starting from the first subcarrier of the first resource block to the last subcarrier of the $L^{th}$ resource block are allocated to the same terminal.

Like mentioned above, between two subcarriers of different subcarrier spacing configurations, equally to resource blocks of different subcarrier spacing configurations a guard band (represented on FIG. 2B and FIG. 2C by the shaded areas) is necessary to avoid interference inter-numerology. Indeed, two subcarriers of the same subcarrier spacing configuration are spaced to respect an orthogonality property, that is the sinc-shaped subcarrier spectra exhibit zero-crossings at all the positions of the other subcarriers with a same subcarrier spacing. On the contrary, the sinc-shaped spectra of subcarriers with a given subcarrier spacing do not exhibit zero crossings at all the positions of subcarriers with a different subcarrier spacing, which engenders inter-numerology interference.

For this reason it is necessary to include a guard band between two resource block of two different numerologies. As shown in FIG. 2B, guard bands are included through the scheduling process, that is by avoiding allocating a resource block contiguously to another resource block when their numerologies are different. By doing so when scheduling resource blocks of a high subcarrier spacing configuration like $\Delta f_2$, aligned on their raster, important loss of resources in the carrier can occur. This can be seen in FIG. 2B by the gap imposed between the third scheduled resource block of subcarrier spacing configuration $\Delta f_1$ and the first resource block of subcarrier spacing configuration like $\Delta f_2$ scheduled, this gap, is at least the size of a resource block of subcarrier spacing configuration $\Delta f_1$ and can even be the size of a resource block of subcarrier spacing configuration $\Delta f_2$, if no more resource blocks of subcarrier spacing configuration $\Delta f_1$ is left to schedule to reduce this gap, which is beyond what is necessary to avoid interference inter-numerology.

Figure 2C:
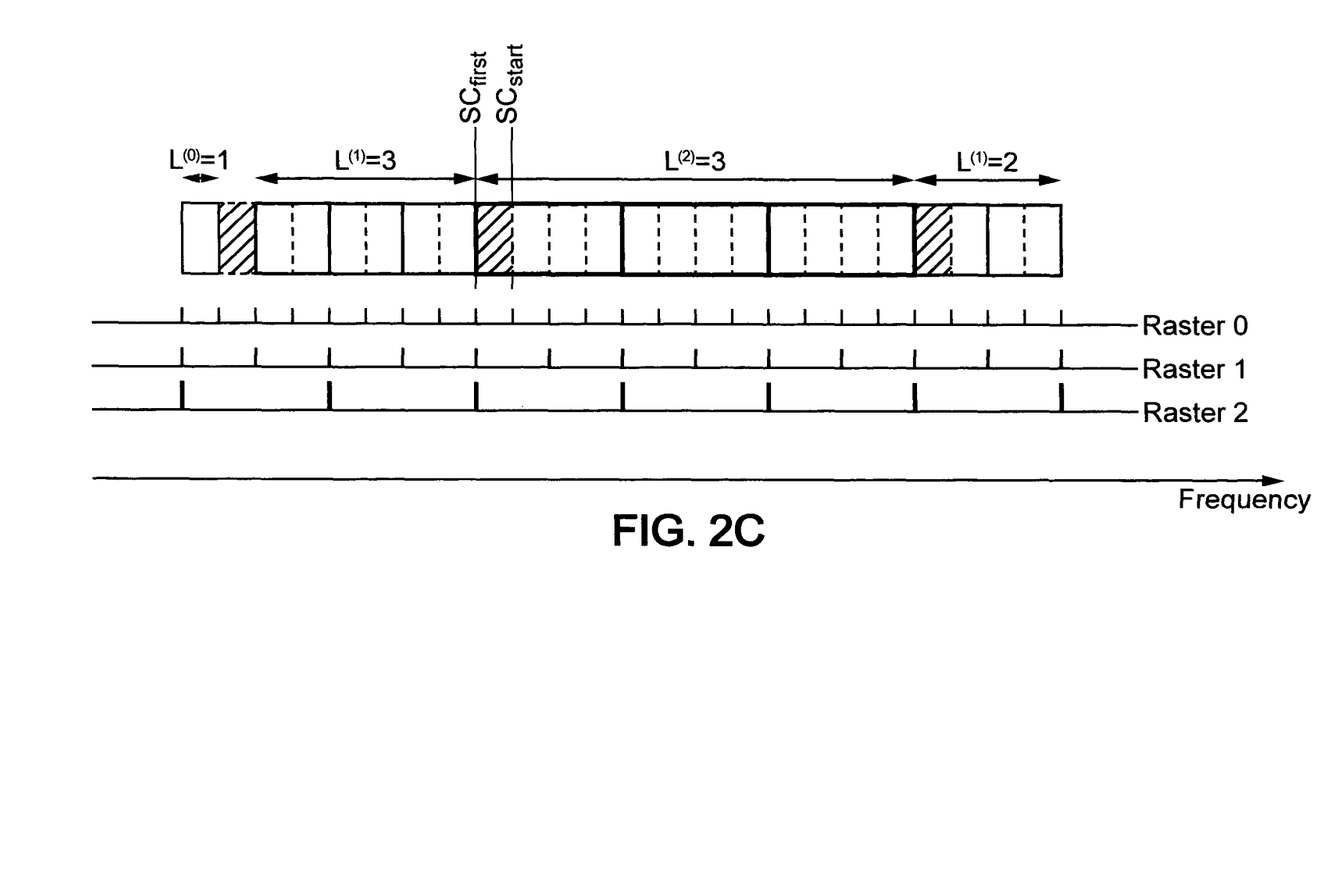
FIG. 2C schematizes resource block scheduling according to the invention in a carrier where several subcarrier spacing configurations coexists.

For the simplicity of the expose, in FIG. 2B and FIG. 2C only the cases where all the reference frequency of each numerology are the same are depicted.

Referring to FIG. 2C, as in the example of FIG. 2B there is shown part of a carrier where several subcarrier spacing configurations coexist and where resource blocks from three of these different numerologies are scheduled. In contrary to FIG. 2B, the first subcarrier of each resource allocation of a subcarrier spacing configuration can be different from the first subcarrier of a resource block of the same subcarrier spacing configuration, aligned on its raster. This enables to set guard bands in a flexible manner, thus avoiding unnecessary large guard band to prevent inter-numerology interference. Indeed, in FIG. 2C, the first subcarrier of the resource allocation (namely $SC_{start}$) of subcarrier spacing configuration $\Delta f_2$ is on the raster of the subcarrier spacing configuration $\Delta f_0$ at $N \cdot \Delta f_0$ from the first subcarrier (namely $SC_{first}$) of the potential resource block of subcarrier spacing configuration $\Delta f_2$, aligned on its raster, to which the first subcarrier of the resource allocation belongs. Thus the subcarriers of subcarrier spacing configuration $\Delta f_2$ between the first subcarrier of said potential resource block and the first subcarrier of the resource allocation are not allocated. Only the fourth subcarrier of said potential resource block and the following subcarriers are allocated. The following subcarriers of this resource allocation are allocated in respect to the raster, that is, the last subcarrier of such a resource allocation is the last subcarrier of a resource block of a subcarrier spacing configuration $\Delta f_2$.

The situation is similar between the last subcarrier of the resource allocation of subcarrier spacing configuration $\Delta f_2$ and the following subcarrier of subcarrier spacing configuration $\Delta f_1$.

More specifically the first subcarrier of the resource allocation of subcarriers of subcarrier spacing configuration $\Delta f_2$ is made according to the raster of subcarrier spacing configuration $\Delta f_0$. This enables to set the size of the guard band with a scale of $N \cdot \Delta f_0$, which is more flexible than a scale of $N \cdot \Delta f_2$. Therefore, the transmitter can determine a guard band of $N \cdot \Delta f_0$, $2 \cdot N \cdot \Delta f_0$ or $3 \cdot N \cdot \Delta f_0$. It is important to notice that when a guard band is set, for instance $k \cdot N \cdot \Delta f_0$, it is possible that no subcarrier of the subcarrier spacing configuration $\Delta f_2$ exist at $k \cdot N \cdot \Delta f_0$, this is the case when $q_2$, such as $\Delta f_2 = q_2 \cdot \Delta f_0$, is not a divisor of N. In this case the $SC_{start}$ of the resource allocation is the first subcarrier of the subcarrier spacing configuration $\Delta f_2$ after the guard band.

To allocate such a resource allocation the transmitter defines the number $NRB_{start}^{(0)}$ of resource blocks of subcarrier spacing configuration $\Delta f_0$ containing subcarriers with frequencies lower than the frequency of the end of the guard band. In addition the transmitter defines the number L, L–1 corresponding to the resource block of subcarrier spacing configuration $\Delta f_2$ ($L^{(2)}$ on FIG. 2C) allocated contiguously and in addition to the uncompleted resource block starting with $SC_{start}$.

Therefore a specific RIV is defined as a function of L and $NRB_{start}^{(0)}$.

For example:

$$\begin{cases} RIV = (L-1) + p_2 * NRB_{start}^{(0)} & \text{if } NRB_{start}^{(0)} \le r_2 + 1 + \\ & [2 \cdot p_2 - 2] \\ RIV = \left\lfloor \dfrac{N_{RB}^{(0)}}{4} \right\rfloor * (r_2 + N_{RB}^{(0)} - 3 - NRB_{start}^{(0)}) + & \text{otherwise} \\ p_2 - L \end{cases}$$

Where $r_2$ is the remainder of the division of $N_{RB}^{(0)}$ by $q_2$ (In the example of FIG. 3, $q_2 = \Delta f_2 / \Delta f_0 = 4$).

Figure 3A:
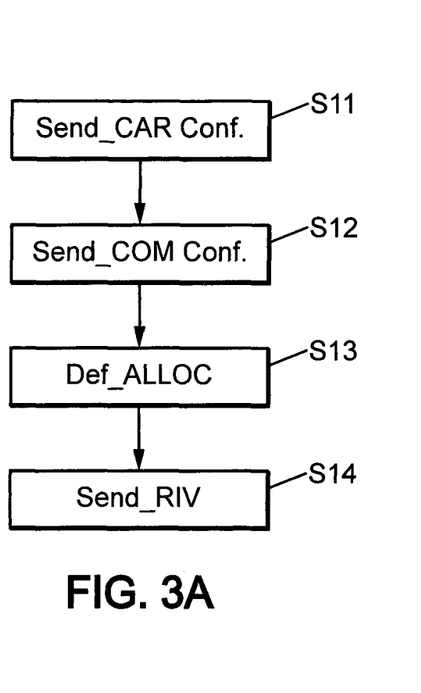
FIG. 3A illustrates a flowchart representing the steps to transmit resource allocation information.

Referring to FIG. 3A there is shown a flowchart representing the steps according to an aspect of the invention, to allocate subcarriers of subcarrier spacing configuration in the carrier by the transmitter to a terminal.

At step S11 the transmitter sends to the terminal parameters concerning the cell settings including the carrier bandwidth BW and information on supported numerologies. More specifically the transmitter sends to the terminal information allowing the terminal to know directly or deduce at least the following parameters: $\Delta f_0$, $\Delta f_2$, $N_{RB}^{(0)}$.

At step S12 the transmitter sends to the terminal the allocation parameters, for example, indications allowing the terminal to deduce which type of subcarriers (subcarrier spacing configuration of the resource blocks) will be allocated to the terminal and therefore which set of formulae or lookup table will be necessary to decode the RIV value, if several sets are possible.

At step S13 the transmitter defines the contiguous subcarriers it allocates to the terminal.

At step S14 the transmitter sends the RIV value through a control channel. The RIV value is calculated with the RIV formula mentioned above based on the contiguous subcarriers the transmitter allocates to the terminal.

Figure 3B:
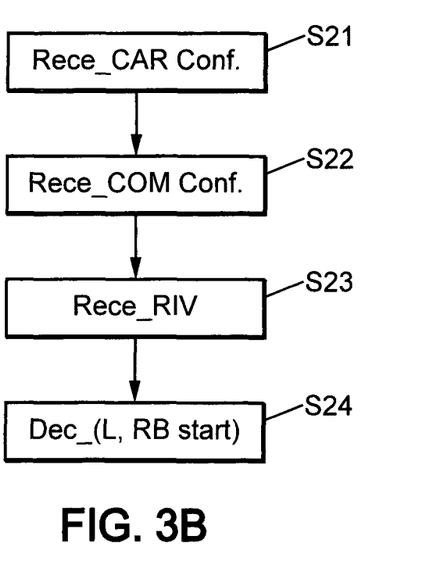
FIG. 3B illustrates a flowchart representing the steps of receiving by the terminal the resource allocation information and decoding this information to define the resource blocks allocated to the terminal.

Referring to FIG. 3B there is shown a flowchart representing the steps according to an aspect of the invention, to define by the terminal the subcarriers that are allocated to it.

At step S21 the terminal receives from the transmitter the parameters concerning the cell settings including the carrier bandwidth BW and information on supported numerologies. More specifically the terminal receives from the transmitter information allowing the terminal to know directly or deduce at least the following parameters: $\Delta f_0$, $\Delta f_2$, $N_{RB}^{(0)}$.

At step S22 the terminal receives from the transmitter the allocation parameters, for example indications allowing the terminal to deduce which type of subcarriers (subcarrier spacing configuration of the resource blocks) will be allocated to it and therefore which set of formula or lookup table will be necessary to decode the RIV value, if several sets are possible.

At step S23 the terminal receives from the transmitter through a control channel, the RIV value corresponding to the subcarriers allocated to the terminal.

At step S24 based on:
the knowledge of $N_{RB}^{(0)}$ and $q_2=\Delta f_2/\Delta f_0=4$, the terminal computes:
$r_2$ the remainder of the division of $N_{RB}^{(0)}$ by 4; and $$p_2 = \left\lfloor \frac{N_{RB}^{(0)}}{4} \right\rfloor;$$

and
the reception of its RIV value the terminal computes:

$$P = \left\lfloor \frac{RIV}{p_2} \right\rfloor;$$

and
R=rem (RIV, $p_2$); and $$NRB_{start}^{(0)} = \begin{cases} P & \text{if } P+4(R+1) \leq N_{RB}^{(0)} \\ N_{RB}^{(0)} - 3 + r_2 - P & \text{otherwise} \end{cases}$$

$$L = \begin{cases} R+1 & \text{if } P+4\cdot(R+1) \leq N_{RB}^{(0)} \\ p_2 + R & \text{otherwise} \end{cases}$$

Based on the values $NRB_{start}^{(0)}$ and L, decoded by the terminal, the terminal can determine a unique $f_{start}$ and a unique $f_{last}$ as shown above.

Of course, the present invention is not limited to the examples of embodiments described in details above, but encompasses also further alternative embodiments.

For example the present invention refers to carrier band of a specific bandwidth but the invention can also be implemented on a pre-defined portion of the entire carrier band, more specifically the pre-defined portion seen by a terminal as the maximum band where its own resource allocation and control signaling can occur.

The invention claimed is:

1. A method for allocating resources to a terminal in a telecommunication system comprising at least a carrier comprising several subcarriers, said carrier supporting at least one subcarrier spacing configuration $\Delta f_0$ and one subcarrier spacing configuration $\Delta f_1$, with $\Delta f_1 = q \cdot \Delta f_0$, q being a strictly positive integer, said method comprising:
   a) selecting the subcarrier spacing configuration $\Delta f_1$;
   b) determining a number L of resource blocks having subcarriers of said subcarrier spacing configuration $\Delta f_1$;
   c) allocating to said terminal subcarriers among the subcarriers of the carrier of subcarrier spacing configurations $\Delta f_1$, having their frequencies:
      greater or equal to a frequency, namely $f_{start}$, being the lowest frequency among frequencies of subcarriers of subcarrier spacing configuration $\Delta f_1$ having a frequency higher than or equal to $f_{ref}+m\cdot N\cdot \Delta f_1 + k\cdot N\cdot \Delta f_0$,
      $f_{ref}$ being the lowest frequency among the subcarriers that are allowable for subcarrier spacing $\Delta f_1$ in the carrier,
      k being an integer greater or equal to 1 and lesser or equal to (q−1),
      N being the number of subcarriers in a resource block,
      m being an integer greater or equal to 0 and lesser than a maximum number of resource blocks, allowable in the carrier, having subcarriers of subcarrier spacing configuration $\Delta f_1$;
      lesser or equal to a frequency $f_{ref}+m\cdot N\cdot \Delta f_1+(L\cdot N-1)\cdot \Delta f_1$, namely $f_{last}$,
   wherein k is determined such as $f_{start}-f_{near}$ is greater than G, G being a strictly positive threshold, and $f_{near}$ being a frequency of a subcarrier with a subcarrier spacing configuration different from $\Delta f_1$, said subcarrier having the highest frequency among frequencies of subcarriers allocated in the carrier having subcarrier spacing configurations different from $\Delta f_1$ and having lower frequencies than $f_{ref}+(m+1)\cdot N\cdot \Delta f_1$.

2. The method according to claim 1, wherein m is determined such as at least one subcarrier of subcarrier spacing configurations $\Delta f_1$, having a frequency of at least $f_{ref}+m\cdot N\cdot \Delta f_1$ and at the most $f_{ref}+(m+1)\cdot N\cdot \Delta f_1-\Delta f_1$, can be allocated to the terminal.

3. The method according to claim 1, wherein the subcarrier spacing configuration $\Delta f_0$ is the smallest subcarrier spacing configuration among the subcarrier spacing configuration supported by the carrier.

4. The method according to claim 1, wherein said number L, L≥1, satisfies to:

$$q\cdot L + NRB_{start}^{(0)} \leq N_{RB}^{(0)}$$

where:
   $N_{RB}^{(0)}$ is a maximum number of resource blocks comprising N subcarriers of the subcarrier spacing configuration $\Delta f_0$ that are allowable in said carrier,
   $NRB_{start}^{(0)}$ is a maximum number of resource blocks comprising N subcarriers of the subcarrier spacing configuration $\Delta f_0$ that are allowable in said carrier, said resource blocks having their subcarriers frequencies lower than said frequency $f_{start}$.

5. The method according to claim 4, further comprising sending to said terminal allocation information based on the subcarriers allocated to the terminal.

6. The method according to claim 5, wherein the allocation information based on the subcarriers allocated to the terminal, is a resource indication value, RIV, which is an integer and a function of L and $NRB_{start}^{(0)}$.

7. The method according to claim 6, wherein said RIV function is an injective function of any couple comprising L and $NRB_{start}^{(0)}$ values.

8. The method according to claim 6, wherein said RIV is a surjective function among the integers from 0 to the maximum value taken by RIV.

9. The method according to claim 6, wherein said RIV is defined by:

$$\begin{cases} RIV = (L-1)\left(r_1 + 1 + \lceil (p_1-1)*\frac{q}{2} \rceil + 1\right) + NRB_{start}^{(0)} \\ \quad \text{if } NRB_{start}^{(0)} \le r_1 + 1 + \lceil (p_1-1)*\frac{q}{2} \rceil \\ RIV = (p_1 - L)*\left(r_1 + 1 + \lceil (p_1-1)*\frac{q}{2} \rceil + 1\right) + \\ \quad (r_1 + 1 + N_{RB}^{(0)} - q - NRB_{start}^{(0)}) \text{ otherwise} \end{cases}$$

where:

$r_1$ is a remainder of the division of $N_{RB}^{(0)}$ by q $$p_1 = \left\lfloor \frac{N_{RB}^{(0)}}{q} \right\rfloor.$$

10. The method according to claim 6, wherein said RIV is defined by:

$$\begin{cases} RIV = (L-1)(N_{RB}^{(0)} - q + r_1 + 2) + NRB_{start}^{(0)} \text{ if } L \le \lceil p_1/2 \rceil \\ RIV = (p_1 - L)*(N_{RB}^{(0)} - q + r_1 + 2) + \\ \quad (N_{RB}^{(0)} - q + r_1 + 1 - NRB_{start}^{(0)}) \text{ otherwise} \end{cases}$$

where:

$r_1$ is a remainder of the division of $N_{RB}^{(0)}$ by q $$p_1 = \left\lfloor \frac{N_{RB}^{(0)}}{q} \right\rfloor.$$

11. The method according to claim 6, wherein said RIV is defined by:

$$RIV = \left(\sum_{l=1}^{L-1} S_l\right) + NRB_{start}^{(0)} = (L-1)*(N_{RB}^{(0)} + 1) - \frac{q*L*(L-1)}{2} + NRB_{start}^{(0)}$$

where:

$S_l = N_{RB}^{(0)} - q*l + 1.$

12. The method according to claim 1, wherein said RIV is defined by:

$$\begin{cases} RIV = (L-1) + p_1 * NRB_{start}^{(0)} & \text{if } NRB_{start}^{(0)} \le r_1 + 1 + \\ & \quad \lceil \frac{1}{2}*q*(p_1-1) \rceil \\ RIV = p_1 * (r_1 + 1 + N_{RB}^{(0)} - q - NRB_{start}^{(0)}) + & \text{otherwise} \\ \quad p_1 - L \end{cases}$$

where:

$r_1$ is a remainder of the division of $N_{RB}^{(0)}$ by q $$p_1 = \left\lfloor \frac{N_{RB}^{(0)}}{q} \right\rfloor.$$

13. A non-transitory computer-readable medium having stored there on a computer program product comprising code instructions to perform the method according to claim 1, when said instructions are run by a processor.

14. A transmitter comprising a processor for allocating resources to a terminal in a telecommunication system comprising at least a carrier comprising several subcarriers, said carrier supporting at least one subcarrier spacing configuration $\Delta f_0$ and one subcarrier spacing configuration $\Delta f_1$, with $\Delta f_1 = q \cdot \Delta f_0$, q being a strictly positive integer, said transmitter being configured to perform:

a) selecting the subcarrier spacing configuration $\Delta f_1$;
b) determining a number L of resource blocks having subcarriers of said subcarrier spacing configuration $\Delta f_1$;
c) allocating to said terminal subcarriers among the subcarriers of the carrier of subcarrier spacing configurations $\Delta f_1$, having their frequencies:
   greater or equal to a frequency, namely $f_{start}$, being the lowest frequency among frequencies of subcarriers of subcarrier spacing configuration $\Delta f_1$ having a frequency higher than or equal to $f_{ref} + m \cdot N \cdot \Delta f_1 + k \cdot N \cdot \Delta f_0$,
   $f_{ref}$ being the lowest frequency among the subcarriers that are allowable for subcarrier spacing $\Delta f_1$ in the carrier,
   k being an integer greater or equal to 1 and lesser or equal to (q−1),
   N being the number of subcarriers in a resource block,
   m being an integer greater or equal to 0 and lesser than a maximum number of resource block, allowable in the carrier, having subcarriers of subcarrier spacing configuration $\Delta f_1$;
   lesser or equal to a frequency $f_{ref} + m \cdot N \cdot \Delta f_1 + (L \cdot N - 1) \cdot \Delta f_1$, namely $f_{last}$,
wherein k is determined such as $f_{start} - f_{near}$ is greater than G, G being a strictly positive threshold, and $f_{near}$ being a frequency of a subcarrier with a subcarrier spacing configuration different from $\Delta f_1$, said subcarrier having the highest frequency among frequencies of subcarriers allocated in the carrier having subcarrier spacing configurations different from $\Delta f_1$ and having lower frequencies than $f_{ref} + (m+1) \cdot N \cdot \Delta f_1$.

15. A transmitter according to claim 14, comprising a memory unit storing, for each couple of possible values of a number $NRB_{start}^{(0)}$ and said L a unique resource indication value RIV, $NRB_{start}^{(0)}$ being a maximum number of resource blocks comprising N subcarriers of the subcarrier spacing configuration $\Delta f_0$ that are allowable in said carrier, said resource blocks having their subcarriers frequencies lower than said frequency $f_{start}$, and wherein said transmitter is further configured to:
- provide a RIV value based on a couple of L and $NRB_{start}^{(0)}$ corresponding to the allocation of subcarriers performed by the transmitter, and
- transmit the RIV to the terminal.

16. A terminal, in a telecommunication system, comprising a processor to use allocated resources in a carrier, said resources having been allocated according to claim 1, comprises:
- a communication module configured to receive an allocation resource block information through a control channel,
- a processing module which is configured to determine the subcarriers that are allocated to said terminal according to the allocation resource block information, wherein the processing module is configured to determine said subcarriers of subcarrier spacing configurations $\Delta f_1$ allocated to the terminal:
  - as having their frequencies greater or equal to $f_{start}$, and
  - as having their frequencies lesser or equal to $f_{last}$.

17. A terminal according to claim 16, wherein said terminal further comprises
- a memory unit storing for each couple of possible values of a number $NRB_{start}^{(0)}$ and said L a unique resource indication value RIV, $NRB_{start}^{(0)}$ being a maximum number of resource blocks comprising N subcarriers of the first subcarrier spacing configuration $\Delta f_0$ that are allowable in said carrier, said resource blocks having their subcarriers frequencies lower than said frequency $f_{start}$,
- and wherein said processing module is configured to read said memory unit and determine the couple values L and $NRB_{start}^{(0)}$ and recover $f_{start}$ and $f_{last}$, upon reception of an RIV value in said allocation resource block information.

* * * * *